US008107383B2

(12) United States Patent
Kashyap et al.

(10) Patent No.: US 8,107,383 B2
(45) Date of Patent: Jan. 31, 2012

(54) REDUCING TRAFFIC LOSS IN AN EAPS SYSTEM

(75) Inventors: Prakash Kashyap, Cupertino, CA (US); Ram Krishnan, Sunnyvale, CA (US); Joydeep Chakravarti, Cupertino, CA (US); David K. Parker, Cheltenham (GB)

(73) Assignee: Extreme Networks, Inc., Santa Clara, CA (US)

( * ) Notice: Subject to any disclaimer, the term of this patent is extended or adjusted under 35 U.S.C. 154(b) by 65 days.

(21) Appl. No.: 12/098,286

(22) Filed: Apr. 4, 2008

(65) Prior Publication Data

US 2009/0252030 A1 Oct. 8, 2009

(51) Int. Cl.
*H04L 12/26* (2006.01)

(52) U.S. Cl. .............................. 370/245; 370/258; 714/3

(58) Field of Classification Search .................. 370/216, 370/221–228, 254–255, 257–258, 389, 390, 370/392, 400–406, 241–253; 709/224, 238, 709/251; 714/1–4
See application file for complete search history.

(56) References Cited

U.S. PATENT DOCUMENTS

| 5,978,378 | A | 11/1999 | Van Seters et al. |
| 6,766,482 | B1 | 7/2004 | Yip et al. |
| 6,801,506 | B1 | 10/2004 | Dey |
| 7,626,930 | B2 * | 12/2009 | Agmon et al. ............... 370/401 |
| 2005/0094634 | A1 * | 5/2005 | Santhanakrishnan et al. ............... 370/389 |
| 2007/0115989 | A1 | 5/2007 | Mirtorabi et al. |
| 2007/0204068 | A1 * | 8/2007 | Oku et al. ............... 709/251 |
| 2007/0253326 | A1 * | 11/2007 | Saha et al. ............... 370/217 |
| 2008/0240118 | A1 | 10/2008 | Roy et al. |
| 2009/0269062 | A1 | 10/2009 | Jestel et al. |
| 2011/0144923 | A1 * | 6/2011 | Gallagher ............... 702/32 |

FOREIGN PATENT DOCUMENTS

| WO | WO 03/077459 | 9/2003 |
| WO | WO 2004/102853 | 11/2004 |
| WO | WO 2008/055427 | 5/2008 |
| WO | WO-2008055427 | 5/2008 |

OTHER PUBLICATIONS

International Search Report & Written Opinion for PCT/US2009/036539 mailed Jul. 24, 2009, 20 pages.
International Search Report and Written Opinion mailed Sep. 29, 2009 for PCT/US2009/051681.
Christensen, M., et al., "Considerations for Internet Group Management Protocol (IGMP) and Multicast Listener Discovery (MLD) Snooping Switches", rfc4541.txt. IETF Standard, Internet Engineering Task Force, May 2006.

(Continued)

*Primary Examiner* — Pao Sinkantarakorn
(74) *Attorney, Agent, or Firm* — Blakely Sokoloff Taylor & Zafman LLP

(57) ABSTRACT

A ring network with an automatic protection switching domain includes a control VLAN and at least one data VLAN. A master node in the ring is connected to at least one transit node. Each node in the ring network is linked to an adjacent node by a primary port or a secondary port. The master node receives notification of a fault via the control VLAN, the fault indicating a failed link between adjacent nodes. In response, the master node unblocks its secondary port to traffic on the data VLAN(s). The forwarding database entries on the master node and on the transit node(s) are flushed. Data traffic is flooded to the ring network until forwarding database entries on the master node and on the transit node(s) have been reestablished.

32 Claims, 6 Drawing Sheets

OTHER PUBLICATIONS

Christensen, M., et al., "IGMP and MLD Snooping Switches", draft-ietf-magma-snoop-00.txt. IEFT Standard-Working-Draft, Internet Engineering Task Force, Oct. 2001.

Schneider, K., et al., "Design and Implementation of an Offload Engine for Internet Group Messaging Protocol Multicast Snooping", IET Communications. 2008, vol. 2, No. 3, pp. 484-492.

Serbest, Y., et al., "Supporting IP Multicast over VPLS", draft-serbest-12vpn-vpls-mcast-03.txt. IETF Standard Working Draft. Internet Engineering Task Force. Jul. 2005.

Non-Final Office Action for U.S. Appl. No. 12/205,715 Mailed Feb. 5, 2010, 17 Pages.

International Preliminary Report on Patentability for PCT Application No. PCT/US2009/036539 Mailed Oct. 14, 2010, 12 Pages.

International Preliminary Report on Patentability for International Patent Application No. PCT/US2009/051681, Mailed Mar. 10, 2011, 18 pages.

*Notice of Allowance for* U.S. Appl. No. 12/205,715, Mailed Aug. 12, 2010, 6 Pages.

\* cited by examiner

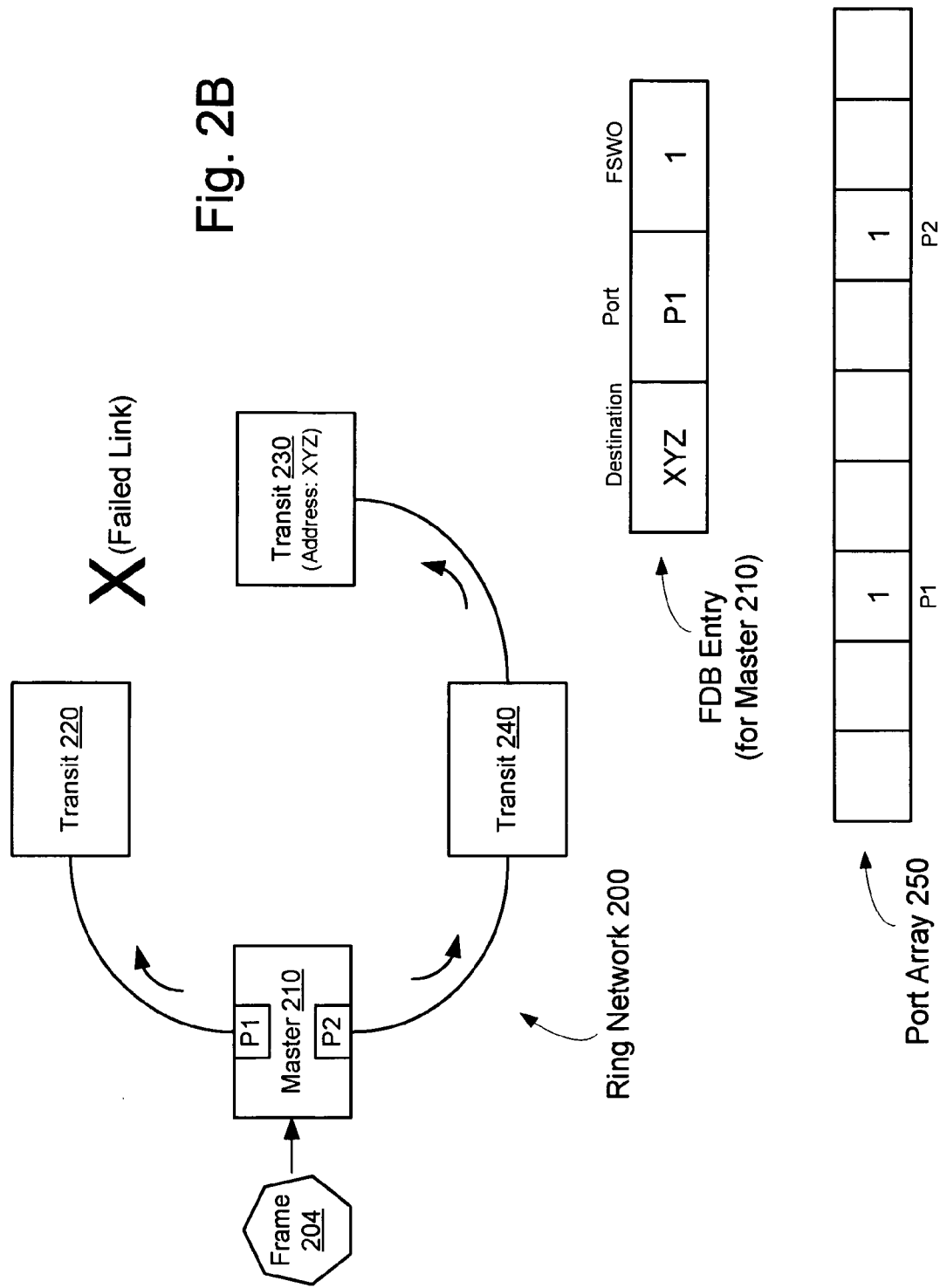

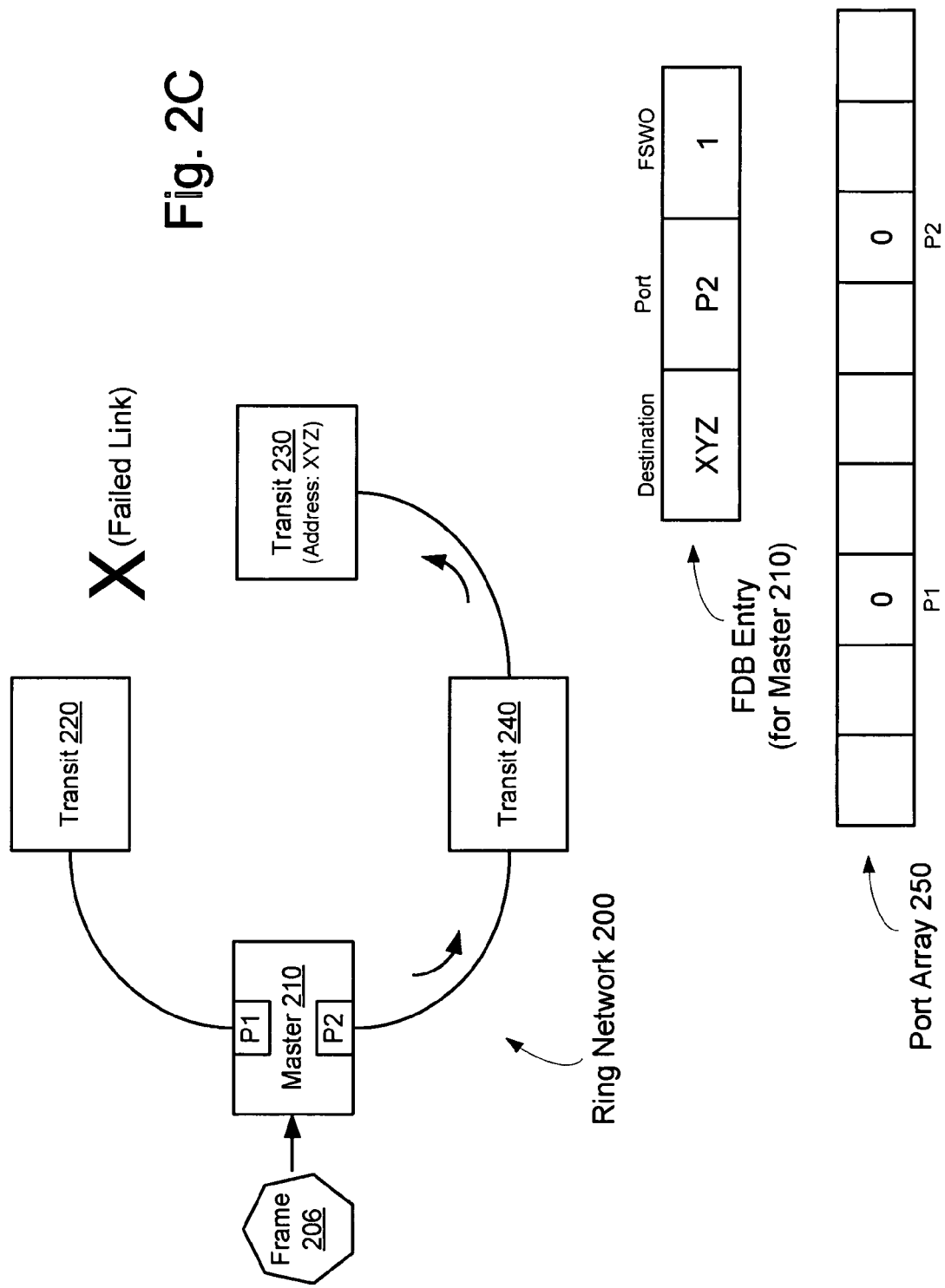

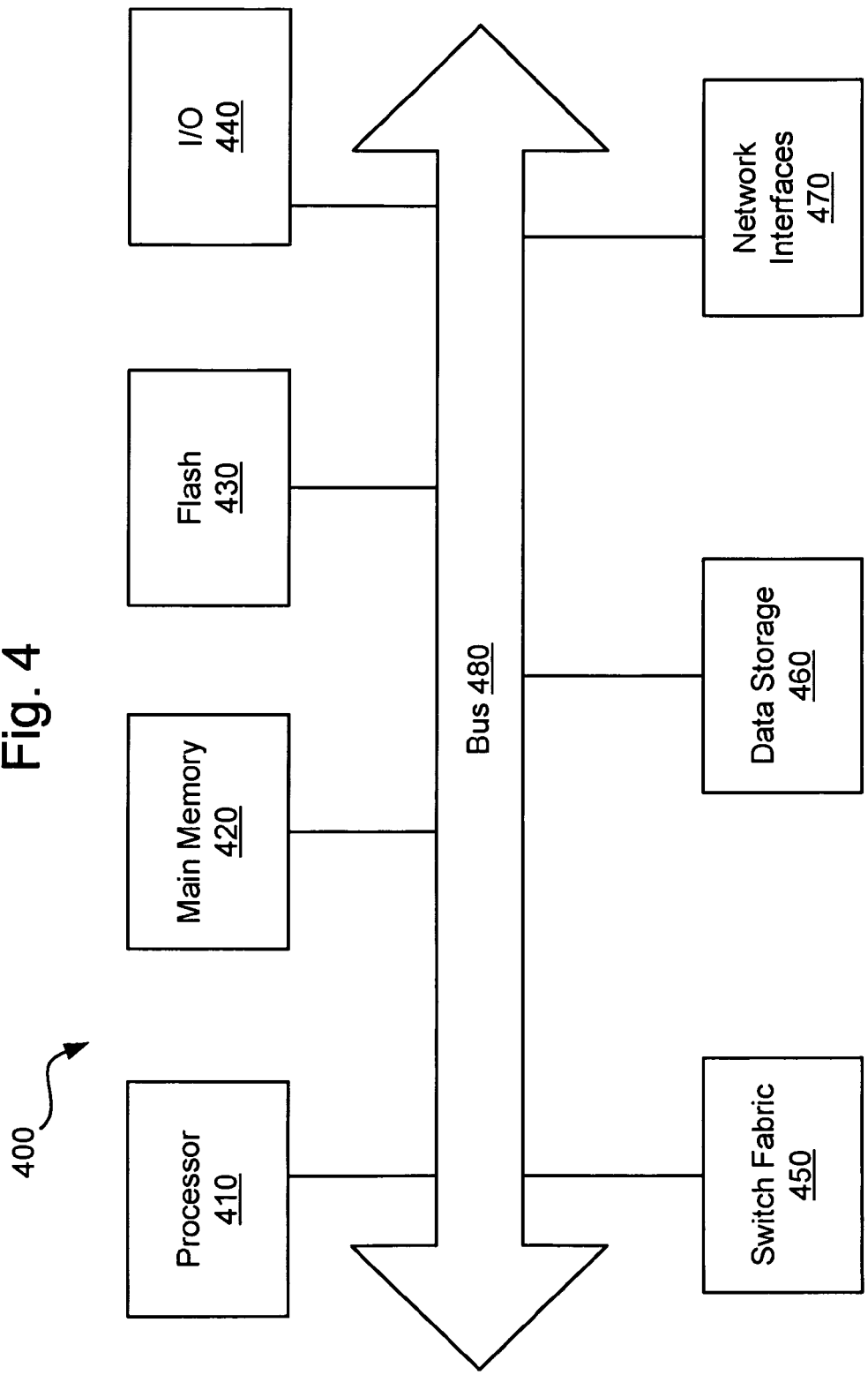

REDUCING TRAFFIC LOSS IN AN EAPS SYSTEM

FIELD

Embodiments of the invention relate to computer networks, and more particularly to automatic protection switching in a ring network.

BACKGROUND

In an Ethernet automatic protection switching (EAPS) system, loops are prevented in a layer-2 network having a ring topology. An EAPS domain includes a control virtual local area network (VLAN) and at least one protected data VLAN. The EAPS domain is associated with a master node which is linked to at least one transit node in a ring network.

When a network failure is detected on the ring, the master node in an EAPS system receives control messages over the control VLAN, the control messages indicating the network failure. During normal operation, the master node blocks the protected data VLAN traffic from traversing its secondary port. During a network failure, the master node unblocks its secondary port and reroutes the protected data VLAN traffic through its secondary port. The secondary port is re-blocked once the failure has been fixed. Each time the secondary port is blocked and unblocked, the forwarding databases on all the nodes in the ring are flushed.

Flushing the forwarding databases on the nodes requires that the forwarding entries and/or paths in each of the forwarding databases be relearned (e.g., automatically relearned) and/or reprogrammed (e.g., manually reprogrammed), both of which are expensive. In either case, reestablishing the forwarding databases does not occur instantaneously. In other words, there is period of time between the commencement of flushing the forwarding databases and subsequently reestablishing them. During this period of time, network connectivity can be temporarily severed and data (e.g., data frames, packets, etc.) can be dropped or lost.

SUMMARY OF THE INVENTION

A ring network with an automatic protection switching domain includes a control VLAN and at least one data VLAN. A master node in the ring is connected to at least one transit node. Each node in the ring network is linked to an adjacent node by a primary port or a secondary port. During normal operation, the master node allows data traffic to flow through its primary port while its secondary port is blocked. By blocking the secondary port, the master node prevents a loop. When a fault is detected on the ring, the fault is communicated to the master node via the control VLAN. A fault indicates a failed link between adjacent nodes. In response to the fault, the master node unblocks its secondary port to traffic on the data VLAN(s).

The change in the flow of traffic causes existing forwarding database entries on the master node and on the transit node(s) to be invalid. Thus, the forwarding database entries are flushed from the master node and the transit node(s). Flushing the forwarding database entries necessitates relearning of forwarding routes based on the new configuration of the ring network (i.e., master node secondary port unblocked). During the period of time between flushing the entries and relearning the entries, data traffic is flooded to the ring network to maintain connectivity and prevent frame and/or packet loss. Once the forwarding database entries are relearned, the traffic flooding automatically stops.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 2B illustrates a state of an EAPS ring network immediately after a link failure according to various embodiments.

FIG. 2C illustrates a state of an EAPS ring network after failover according to various embodiments.

FIG. 4 is a block diagram illustrating a suitable computing environment for practicing various embodiments.

DETAILED DESCRIPTION

As provided herein, methods, apparatuses, and systems prevent maintain connectivity and prevent frame and/or packet loss upon the occurrence of a fault on a ring network that employs Ethernet automatic protection switching (EAPS).

Figure 1:
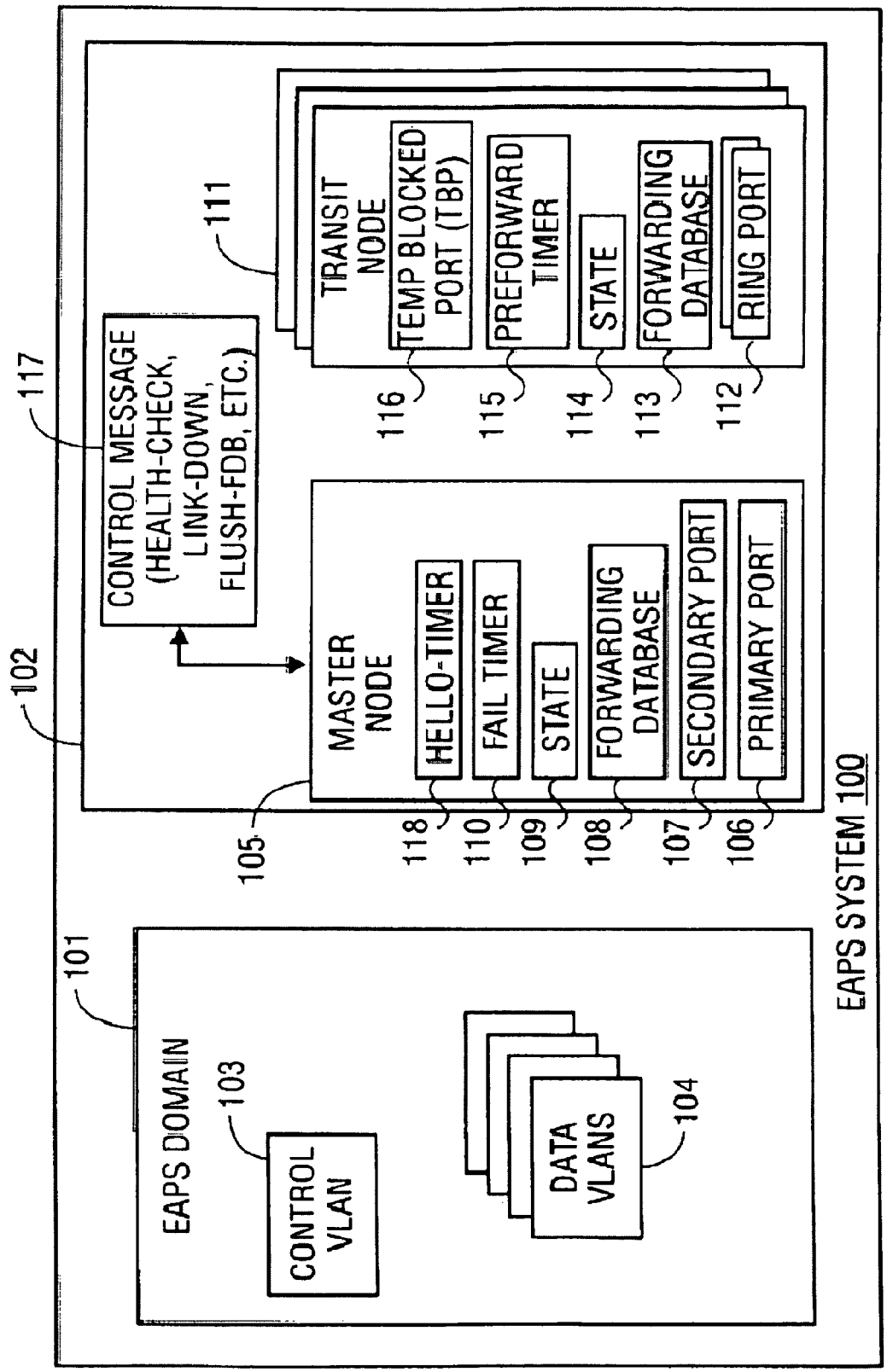
FIG. 1 illustrates a prior art Ethernet automatic protection switching (EAPS) system.

FIG. 1 is a block diagram illustrating a prior art EAPS system. The EAPS system 100 consists of one or more EAPS domains 101. A control VLAN 103 is created for each EAPS domain 101 for the purpose of sending and receiving EAPS system control messages 117. The EAPS domain 101 is created to protect a group of one or more data carrying VLANs 104.

The EAPS system 100 operates on a ring network 102. One node on the ring network 102 is designated as the master node 105. The two ring ports on the master node 105 are designated as primary port 106 and secondary port 107. All other nodes on the ring network 102 are transit nodes 111 and each has its respective ring ports 112. Each master node 105 and transit node 111 has a forwarding database (FDB), 108 and 113 respectively, in which they store information about the network communication paths. The master node 105 has a state register 109 for storing the state of the ring network 102. For the purpose of illustration, the states of the ring network 102 are described either as "failed," meaning there is a fault or break in the ring network 102, or as "complete," meaning that the ring network is unbroken or the ring network has been restored and all nodes are communicating correctly. The transit nodes 111 have a state register 114 in which they store the pre-forwarding state, and a pre-forwarding timer 115. The transit nodes 111 also have a temporarily-blocked-port storage area (TBP) 116 in which they store the identification of the port that is temporarily blocked. Pre-forwarding and TBPs are discussed below.

In various embodiments, the master node 105 and the transit nodes 111 use control messages 117 to communicate via the control VLAN 103. Some examples of control messages 117 in embodiments are health-check messages, link-down messages, and flush-FDB messages. The transit node 111 recognizes a message sent on the control VLAN 103 as a control message 117 because it has a special MAC (media access control) address that corresponds to an entry in the forwarding database 113. The master node and the transit nodes forward the control message 117 prior to copying it to the central processing unit (CPU) of the node where, among other things, it is logged for use in troubleshooting. Forwarding the control message 117 before processing by the CPU facilitates the convergence of the ring network 102 after a fault in substantially less time than can be achieved with previous prior art methods.

The master node 105 has a hello-timer 118, which is the clock for sending the health-check control messages 117. Once the hello-timer 118 is started, it prompts the master node 105 to send a health-check message 117 on the control VLAN 103 at regular intervals, for example every one second. The health-check message 117 is forwarded around the ring network 102 and returns to the master node 105 nearly instantaneously. When the master node 105 sends the health-check message 117, it sets the fail-timer 110. Should the fail-timer 110 expire before the health-check message is returned to the master node 105, the master node 105 determines that there is a fault in the ring network 102. The health-check messages 117 are sent even during a fault. When the fault is restored, the master node 105 knows immediately because the return of the health-check message 117 is resumed.

As used herein, the time it takes to bring a network from a failed state to a complete state, is referred to as the "failover" time. In other words, the failover time is the time it takes to relearn the FDB entries after they have been flushed. While the flushing of FDB entries is appropriately associated with link failure or other fault, flushing can also occur intentionally (e.g., for network maintenance, etc.). Given that a system might include 100,000 hosts or more, each having a separate route entry, the failover time can be significant from a network connectivity perspective. Prior art FDB entries simply define an output port through which data should be forwarded to reach a particular destination. During a failover period, many of these FDB entries can become invalid because the path through the defined output port may include the failed link. Invalid FDB entries can cause data traffic (e.g., frames, packets, etc.) to be lost or dropped. In order to reduce the frame and/or packet loss in an EAPS system during failover, an additional field, referred to herein as a fast-switchover (FSWO) field, is added to FDB entries in the FDB database(s).

In various embodiments, the FSWO field is a 1-bit field added to an FDB entry, though the field could be multiple bits in different embodiments. The FSWO field indicates whether the output port defined in the FDB entry is susceptible to invalidity during failover. Thus, the FSWO bit is set high (e.g., set to 1) for FDB entries that are susceptible to invalidity. A low (e.g., 0) FSWO bit could be defined as indicating that an FDB entry is susceptible to invalidity in other embodiments. In various embodiments, the FSWO field is examined whenever an FDB entry is accessed. It is not important whether the FSWO field is examined before or after the output port field of an FDB entry.

When the FSWO bit of an entry is set high, indicating that the entry is susceptible to being invalid, a special port array is accessed. The port array is maintained in hardware for fast access (e.g., in an internal RAM, etc.). More specifically, the port array is a global resource and allows for memory indexing, as opposed to requiring a search for a particular port. Memory indexing with the port array minimizes hardware resources because each EAPS port requires only a single bit in the port array as opposed to 9, 13, or 16 bits, etc., for searching each entry, depending on the bit length of an FDB entry. The port array could be maintained in software in other embodiments.

In various embodiments, the port array includes one bit in the array for each port in the EAPS system. For example, a system having 512 ports would have a port array with 512 bits (e.g., [0:511]). Whenever the EAPS system detects a fault or link failure, the port array is modified by setting the bit for each of the EAPS-controlled ports to high (e.g., 1). A high bit in the port array indicates the need to flood traffic to all relevant EAPS ports. For example, a high bit in the port array for port X signifies that all traffic that would normally be routed through port X should be flooded to all ports. In this way, frames and/or packets that would otherwise be dropped or lost are able to reach their destination. Flooding on relevant EAPS ports occurs as long as the one or more bits in the port array are high. When a failover period has ended (i.e., the FDB entries have been relearned and/or reprogrammed to account for the link failure), the port array bits are set low (e.g., to 0). In other embodiments, the port array bits can be set low upon the expiration of a timer. Thus, subsequent accesses to the port array (based on a high FSWO bit in the FDB entry) will indicate that flooding is not necessary.

Figure 2A:
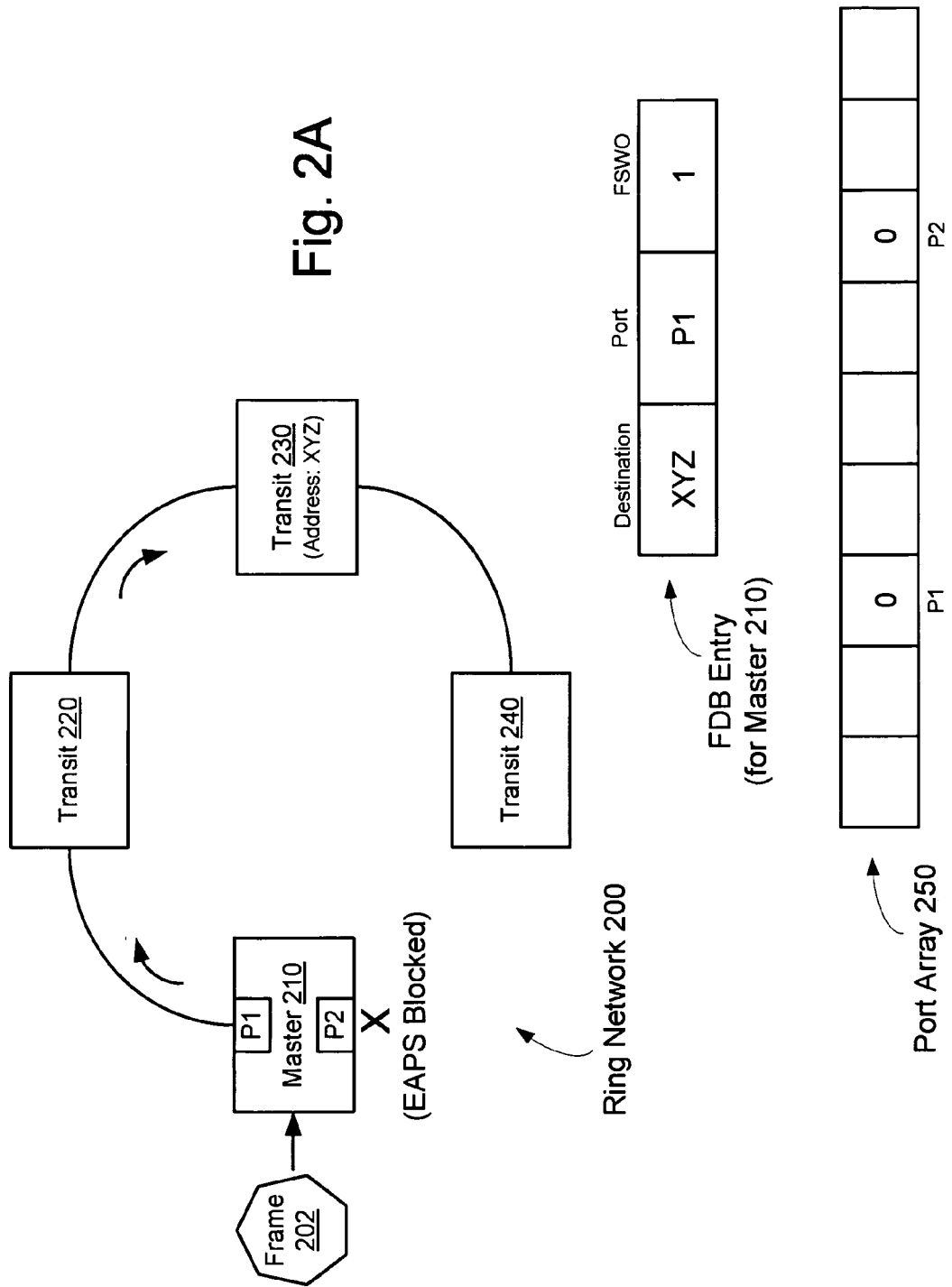
FIG. 2A illustrates a state of an EAPS ring network during normal operation according to various embodiments.

FIGS. 2A-2C illustrate a ring network incorporating an EAPS system. In particular, FIG. 2A illustrates ring network 200 during normal operation. Master node 210 has a primary port (P1) and a secondary port (P2). According to the EAPS system configuration, traffic on the data VLAN is blocked from flowing through port P2. Thus, all traffic from master node is forwarded through port P1. The process for making a forwarding decision is illustrated by way of example below.

In this example, an incoming frame 202 arrives at master node 210 having a destination of transit node 230 (address: XYZ). The FDB entry shown in FIG. 2A illustrates the forwarding decision process. When incoming frame 202 arrives at master node 210, the entry corresponding to the destination address XYZ is accessed. Upon accessing the entry, the output port field is examined and determined to be port P1. However, the process does not end after determining the output port. Subsequent to determining the output port, the fast-switchover (FSWO) bit in the FDB entry is examined. If the FSWO bit is set high (e.g., 1), then the P1 bit of the EAPS system port array 250 must be checked. Given that the P1 bit in port array 250 is low (e.g., 0) in FIG. 2A, flooding is not warranted. Thus, master node 210 proceeds to forward incoming frame 202 on port P1 as indicated in the FDB entry.

Continuing with the example, FIG. 2B illustrates the state of the ring network 200 immediately after a link failure between transit nodes 220 and 230. The link failure is communicated to master node 210 via the EAPS system control VLAN. Additionally, the port array 250 for the EAPS system is updated so that the bits corresponding to EAPS ports are set high (e.g., 1). In response to the detected link failure, master node 210 unblocks its secondary port P2. Thus, when incoming frame 204, destined for transit node 230, arrives at master node 210, the FDB entry, as shown in FIG. 2B, erroneously indicates that the frame should be forwarded on port P1. This is ok, however, because the query does not end after examining the output port field. After the output port field is examined, the P1 bit of port array 250 is examined because the FSWO bit of the FDB entry is set high (e.g., 1). Here, the P1 bit of port array 250 is also set high, having been updated on account of the link failure. A high bit in port array 250 indicates that the incoming frame should be flooded on all relevant EAPS ports. Thus, the frame 204 is flooded out on both ports of master node 210 (i.e., P1 and P2). If not for the flooding, the frame 204 would have been routed out on port P1, as directed by the FDB entry, and would not have reached transit node 230 because of the failed link between transit nodes 220 and 230. However, because frame 204 was flooded on both ports P1 and P2, the frame now has a path through port P2 to its destination (i.e., transit node 230).

FIG. 2C illustrates ring network 200, the FDB entry 212, and the port array 250 after the EAPS-related FDB entries have been flushed and relearned. When incoming frame 206, destined for transit node 230, arrives at master node 210, FDB entry 212 now correctly indicates that the frame should be forwarded on port P2. The FSWO bit is still set high, indicating the need to check port array 250 before forwarding the frame on port P2. Given that the EAPS-related FDB entries have been relearned to reflect the current state of the ring network 200, the bits in port array 250 are set low (e.g., to 0). Thus, flooding is not necessary and master node 210 can proceed to forward frame 206 on port P2 towards transit node 230.

Figure 3:
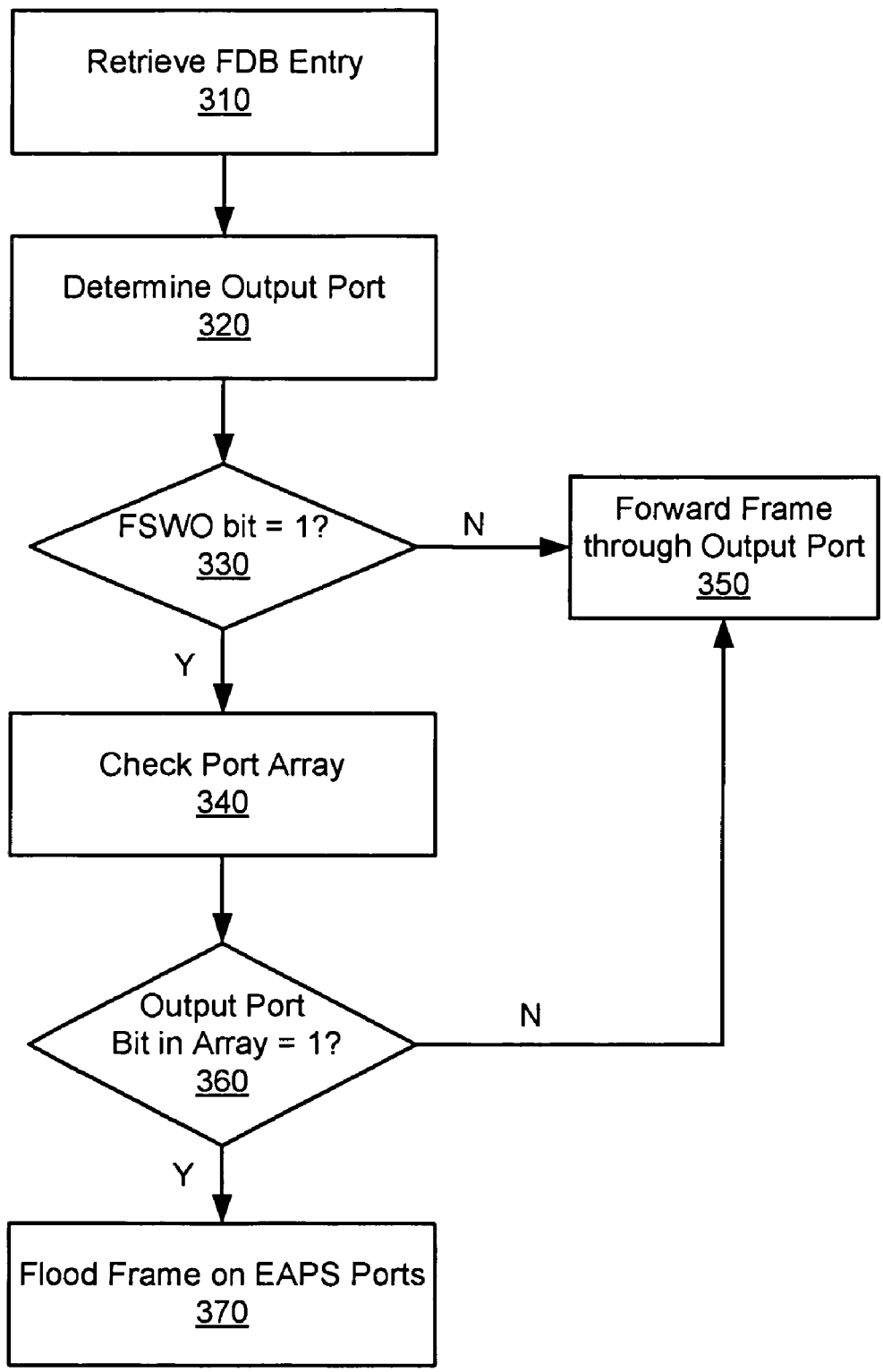
FIG. 3 is a flow diagram illustrating a process for forwarding data traffic according to various embodiments.

FIG. 3 is a flow diagram illustrating a process for forwarding a data frame and/or packet on an EAPS-enabled ring network according to various embodiments. When a frame is received at a node other than its final destination, an FDB entry is retrieved 310 based on the frame's destination address (e.g., MAC address, IP address, etc.). An output port field in the FDB entry indicates the port on which the frame should be forwarded in order to reach its destination. Thus, the output port is determined 320. The FDB entry also includes a fast-switchover (FSWO) field (e.g., a 1-bit field). If it is determined 330 that the FSWO bit is set high (e.g., equal to 1), then it is necessary to check the port array 340. This is because entries with a high FSWO bit may become invalid in the event of a link failure or other fault on the ring network. The port array is updated to indicate the existence of a link failure or fault and the need to compensate for it. Thus, the port array is checked 340 to determine 360 if the port array bit corresponding to the output port (determined in step 320) is set high (e.g., equal to 1). If the bit is not set high, then the frame is forwarded 350 through the output port (determined in step 320). However, if the bit is set high, then a fault or failure condition has occurred; thus, the frame is flooded 370 on the relevant EAPS ports.

Those skilled in the art will appreciate that various alternate embodiments can be practiced in addition to the embodiments described above. For example, while the embodiments described above are generally applicable to layer 2 (e.g., data link layer), it is also contemplated that embodiments could be implemented using layer 3 (e.g., network layer). For example, rather than having a MAC address as the destination in an FDB entry (layer 2), an Internet Protocol (IP) address could be used as the destination address in a layer 3 FDB entry. In layer 3 embodiments, FDB entries might include a VLAN field in addition to the output port field because the output VLAN might be different than the input VLAN in layer 3. Additionally, embodiments are not limited to unicast traffic or single path routing; multi-cast traffic and equal cost multi-path routing (ECMP) can be used in other embodiments.

FIG. 4 illustrates computing environment in which certain aspects of the invention illustrated in FIGS. 1-3 may be practiced in various embodiments. Collectively, these components are intended to represent a broad category of hardware systems, including but not limited to general purpose computer systems and specialized network switches.

Computer system 400 includes processor 410, I/O devices 440, main memory 420 and flash memory 430 coupled to each other via a bus 480. Main memory 420, which can include one or more of system memory (RAM), and nonvolatile storage devices (e.g., magnetic or optical disks), stores instructions and data for use by processor 410. Additionally, the network interfaces 470, data storage 460, and switch fabric 450 are coupled to each other via a bus 480. Data storage 460 represents the routing database (i.e., route tables) described herein as well as other storage areas such as packet buffers, etc., used by the switch fabric 450 for forwarding network packets or messages.

The various components of computer system 400 may be rearranged in various embodiments, and some embodiments may not require nor include all of the above components. Furthermore, additional components may be included in system 400, such as additional processors (e.g., a digital signal processor), storage devices, memories, network/communication interfaces, etc.

In the illustrated embodiment of FIG. 4, the method and apparatus reducing route table size according to the present invention as discussed above may be implemented as a series of software routines run by computer system 400 of FIG. 4. These software routines comprise a plurality or series of instructions to be executed by a processing system in a hardware system, such as processor 410. Initially, the series of instructions are stored on a data storage device 460 (e.g., in a route manager database), memory 420 or flash 430.

Various components described herein, including the components of FIG. 4, may be a means for performing the functions described herein. In a case where a component to perform operations described herein includes software, the software data, instructions, and/or configuration may be provided via an article of manufacture by a machine/electronic device/hardware. An article of manufacture may include a computer readable medium having content to provide instructions, data, etc. The content may result in an electronic device as described herein, performing various operations or executions described. A computer readable medium includes any mechanism that provides (i.e., stores and/or transmits) information/content in a form accessible by a computer (e.g., computer, computing device, electronic device, electronic system/subsystem, etc.). For example, a computer readable medium includes recordable/non-recordable media (e.g., read only memory (ROM), random access memory (RAM), magnetic disk storage media, optical storage media, flash memory devices, etc.). The computer readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:
1. A method comprising:
retrieving a forwarding database (FDB) entry from a forwarding device on a ring network with an automatic protection switching domain;
determining an output port associated with the FDB entry;

inspecting a field in the FDB entry, the field to indicate whether the output port is susceptible to invalidity upon a fault in the ring network;

inspecting a port field associated with the output port in a port array, wherein inspecting the port field is in response to inspecting the field in the FDB entry;

detecting a fault in the ring network, the ring network having a master node connected to at least one transit node, each node linked to an adjacent node by at least one of a primary port or a secondary port, the fault indicating a failed link between adjacent nodes;

unblocking the secondary port of the master node in response to detecting the fault; and flooding traffic through all communicating ports in the ring network in response to inspecting the port field in the port array and unblocking the secondary port, the communicating ports including the primary port and the unblocked secondary port of the master node, wherein flooding the traffic until respective forwarding database entries on the master node and on the at least one transit node have been reestablished.

2. The method of claim 1, further comprising flushing forwarding database entries on the master node and on the at least one transit node.

3. The method of claim 1, wherein the field in the FDB entry to indicate whether the output port is susceptible to invalidity upon a fault in the ring network is a fast-switchover.

4. The method of claim 1, wherein the forwarding device is one of a layer 2 switch and a layer 3 router.

5. The method of claim 1, wherein inspecting the port field associated with the output port in the port array comprises inspecting the port field when the field in the FDB entry indicates that the output port is susceptible to invalidity.

6. An article of manufacture comprising a computer-readable storage medium having content stored thereon to provide instructions that when executed result in an electronic device performing operations including:

retrieving a forwarding database (FDB) entry from a forwarding device on a ring network with an automatic protection switching domain;

determining an output port associated with the FDB entry;

inspecting a field in the FDB entry, the field to indicate whether the output port is susceptible to invalidity upon a fault in the ring network;

inspecting a port field associated with the output port in a port array, wherein inspecting the port field is in response to inspecting the field in the FDB entry;

detecting a fault in the ring network, the ring network having a master node connected to at least one transit node, each node linked to an adjacent node by at least one of a primary port or a secondary port, the fault indicating a failed link between adjacent nodes;

unblocking the secondary port of the master node in response to detecting the fault; and flooding traffic through all communicating ports in the ring network in response to inspecting the port field in the port array and unblocking the secondary port, the communicating ports including the primary port and the unblocked secondary port of the master node, wherein flooding the traffic until respective forwarding database entries on the master node and on the at least one transit node have been reestablished.

7. The article of manufacture of claim 6, wherein the computer readable storage medium having content stored thereon to provide instructions that when executed result in the electronic device performing further operations including flushing forwarding database entries on the master node and on the at least one transit node.

8. A system comprising:

a memory to store a forwarding table associated with a forwarding device;

means for retrieving a forwarding database (FDB) entry from the forwarding device on a ring network with an automatic protection switching domain;

means for determining an output port associated with the FDB entry;

means for inspecting a field in the FDB entry, the field to indicate whether the output port is susceptible to invalidity upon a limit in the ring network;

means for inspecting a port field associated with the output port in a port array, wherein inspecting the port field is in response to inspecting the field in the FDB entry;

means for detecting a fault in a ring network, the ring network having a master node connected to at least one transit node, each node linked to an adjacent node by at least one of a primary port or a secondary port, the fault indicating a failed link between adjacent nodes;

means for unblocking the secondary port of the master node in response to detecting the fault; and means for flooding traffic through all communicating ports in the ring network in response to inspecting the port field in the port array and unblocking the secondary port, the communicating ports including the primary port and the unblocked secondary port of the master node, wherein the means for flooding to flood the traffic until respective forwarding database entries on the master node and on the at least one transit node have been reestablished.

9. The system of claim 8, wherein the forwarding device is one of a layer 2 switch and a layer 3 router.

10. The system of claim 8, wherein the field in the FDB entry to indicate whether the output port is susceptible to invalidity upon a fault in the ring network is a fast-switchover field.

11. The system of claim 8, wherein the means for inspecting the port field associated with the output port in the port array further comprises means for inspecting the port field when the field in the FDB entry indicates that the output port is susceptible to invalidity.

12. A method comprising:

retrieving a forwarding database (FDB) entry from a forwarding device on a ring network with an automatic protection switching domain;

determining an output port associated with the FDB entry;

inspecting a field in the FDB entry, the field to indicate whether the output port is susceptible to invalidity upon a fault in the ring network;

inspecting a port field associated with the output port in a port array, wherein inspecting the port field is in response to inspecting the field in the FDB entry; and flooding traffic to ring ports associated with the automatic protection switching domain responsive to the inspected port field associated with the output port in the port array.

13. The method of claim 12, wherein the field in the FDB entry to indicate whether the output port is susceptible to invalidity upon a fault in the ring network is a fast-switchover field.

14. The method of claim 12, wherein inspecting the port field associated with the output port in the port array comprises inspecting the port field when the field in the FDB entry indicates that the output port is susceptible to invalidity.

15. The method of claim 12, wherein the field to indicate whether the output port is susceptible to invalidity upon a fault in the ring network is a 1-bit field.

16. The method of claim 12, wherein the port array is maintained in a random access memory (RAM).

17. The method of claim 12 further comprising modifying the port array when a fault in the ring network is detected.

18. The method of claim 12, wherein the forwarding device is one of a layer 2 switch and a layer 3 router.

19. An article of manufacture comprising computer readable storage medium having content stored thereon to provide instructions that when executed result in an electronic device performing a method comprising:
retrieving a forwarding database (FDB) entry from a forwarding device on a ring network with an automatic protection switching domain;
determining an output port associated with the FDB entry;
inspecting a field in the FDB entry, the field to indicate whether the output port is susceptible to invalidity upon a fault in the ring network;
inspecting a port field associated with the output port in a port array, wherein inspecting the port field is in response to inspecting the field in the FDB entry; and
flooding traffic to ring ports associated with the automatic protection switching domain responsive to the inspected port field associated with the output port in the port array.

20. The article of manufacture of claim 19, wherein the field in the FDB entry to indicate whether the output port is susceptible to invalidity upon a fault in the ring network is a fast-switchover.

21. The article of manufacture of claim 19, wherein inspecting the port field associated with the output port in the port array comprises inspecting the port field when the field in the FDB entry indicates that the output port is susceptible to invalidity.

22. The article of manufacture of claim 19, wherein the field to indicate whether the output port is susceptible to invalidity upon a fault in the ring network is a 1-bit field.

23. The article of manufacture of claim 19, wherein the port array is maintained in a random access memory (RAM).

24. The article of manufacture of claim 19 with computer readable storage medium having content stored thereon to provide further instructions that when executed result in the electronic device performing a further method comprising, modifying the port array when a fault in the ring network is detected.

25. The article of manufacture of claim 19, wherein the forwarding device is one of a layer 2 switch and a layer 3 router.

26. An apparatus comprising:
logic for retrieving a forwarding database (FDB) entry from a forwarding device on a ring network with an automatic protection switching domain;
logic for determining an output port associated with the FDB entry;
logic for inspecting a field in the FDB entry, the field to indicate whether the output port is susceptible to invalidity upon a fault in the ring network;
logic for inspecting a port field associated with the output port in a port array, wherein inspecting the port field is in response to inspecting the field in the FDB entry; and
logic for flooding traffic to ring ports associated with the automatic protection switching domain responsive to the inspected port field associated with the output port in the port array.

27. The apparatus of claim 26, wherein the field in the FDB entry to indicate whether the output port is susceptible to invalidity upon a fault in the ring network is a fast-switchover field.

28. The apparatus of claim 26, wherein the logic for inspecting the port field associated with the output port in the port array comprises logic for inspecting the port field when the field in the FDB entry indicates that the output port is susceptible to invalidity.

29. The apparatus of claim 26, wherein the field to indicate whether the output port is susceptible to invalidity upon a fault in the ring network is a 1-bit field.

30. The apparatus of claim 26, wherein the port array is maintained in a random access memory (RAM).

31. The apparatus of claim 26 further comprising logic for modifying the port array when a fault in the ring network is detected.

32. The apparatus of claim 26, the forwarding device is one of a layer 2 switch and a layer 3 router.

* * * * *